UNITED STATES PATENT OFFICE.

SAMUEL LEWIS SUMMERS, OF PHILADELPHIA, PENNSYLVANIA.

ALKALINE-EARTH SALTS OF METHYLENE DISALICYLIC ACID AND PROCESS OF MAKING SAME.

SPECIFICATION forming part of Letters Patent No. 716,592, dated December 23, 1902.

Application filed June 16, 1902. Serial No. 111,934. (No specimens.)

*To all whom it may concern:*

Be it known that I, SAMUEL LEWIS SUMMERS, a citizen of the United States, residing in the city of Philadelphia, State of Pennsylvania, have invented and discovered certain new and useful Alkaline-Earth Salts of Methylene Disalicylic Acid and Process of Producing the Same, of which the following is a full, clear, and exact description.

My invention relates to a new chemical compound having especial utility as a pharmaceutical product by reason of its therapeutic value, particularly as an internally-administered antiseptic in gastro-intestinal diseases, wherein doses of from two to five grains produce marked beneficial results, and I believe it will be found useful in other cases as the result of further clinical tests.

The new body is generically the resultant of the reaction of a salt of an alkali earth on a previously-formed alkali salt of methylene disalicylic acid.

In a former application for Letters Patent filed by me April 24, 1902, Serial No. 104,821, I have described and claimed an acid body—namely, methylene disalicylic acid—which will be found fully described in the specification attached to said application and which therefore need not be further described herein, save to say that it is a crystalline body composed of two salicylic-acid molecules deprived of one hydrogen atom in each salicylic-acid group and chemically united or held together by the methylene group. In another application bearing even date herewith I have described and claimed the product and process of making the alkali-metal salts of this body and which being fully described therein need not be here repeated, save to say generally that it consists in taking a soluble compound of one of the alkalies—such as sodium, ammonium, lithium, or potassium—and allowing it to react on methylene disalicylic acid I produce an alkali salt thereof, which may be described as having the formula $C_{15}H_{10}O_6(R')_2$, in which the R' represents a monovalent alkali metal.

My present invention consists in taking one of the last-named bodies as a starting material and allowing a soluble salt of one of the alkali earths, as hereinafter stated, to react thereon in the manner and proportions described, whereby I produce another new body having valuable medicinal properties—namely, an alkaline-earth salt of methylene disalicylic acid, in and with which one divalent atom of the alkali-earth metal in the salt employed in the reaction is chemically united.

For example, desiring to produce the calcium salt from the sodium methylene disalicylate referred to, I take three hundred and thirty-two parts of the latter, dissolved in five thousand parts of water, and add thereto a solution, in five hundred parts of water, of one hundred and twenty parts of pure dry calcium chlorid, whereupon a precipitate is formed which is to be washed free from soluble salts, giving a powder which is white, nearly insoluble in water and alcohol, and having the formula $C_{13}H_{10}O_2(COO)_2Ca$. An analogous reaction takes place if an aqueous solution, in two thousand parts of water, of two hundred and twenty parts of pure barium chlorid or an aqueous solution, in two thousand parts of water, of two hundred and twenty parts of pure strontium nitrate is substituted for the aqueous solution of calcium chlorid, the resulting specific alkaline-earth salt of the body acted on in each case being produced by the same general reaction and having the same general characteristics, differing, of course, in color of the end product and the alkali-earth metal of the formula.

Having thus described my invention, what I claim as new, and desire to secure by Letters Patent, is—

1. The new product described, which is a salt wherein a metal of an alkaline earth is chemically united with the acid radical of methylene disalicylic acid; a granular body, nearly insoluble in water and alcohol, and having the chemical constitution hereinabove recited.

2. The process described of producing the alkaline-earth salts of methylene disalicylic acid, which consists in allowing a solution of the salts of an alkaline earth to react on an alkali salt of methylene disalicylic acid in aqueous solution, and isolating the resultant precipitate.

In testimony whereof I have hereunto affixed my signature this 9th day of June, A. D. 1902.

SAMUEL LEWIS SUMMERS.

Witnesses:
WAYNE P. RAMBO,
PHINEAS RAMBO.